US010545371B2

(12) United States Patent
Yuki et al.

(10) Patent No.: US 10,545,371 B2
(45) Date of Patent: Jan. 28, 2020

(54) LIQUID CRYSTAL DISPLAY DEVICE AND ON-BOARD DISPLAY DEVICE

(71) Applicant: Mitsubishi Electric Corporation, Tokyo (JP)

(72) Inventors: Akimasa Yuki, Tokyo (JP); Hiroshi Umeda, Tokyo (JP); Takashi Tajiri, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/877,058

(22) Filed: Jan. 22, 2018

(65) Prior Publication Data

US 2018/0224697 A1    Aug. 9, 2018

(30) Foreign Application Priority Data

Feb. 8, 2017    (JP) .................................. 2017-020861

(51) Int. Cl.
*G02F 1/133* (2006.01)
*G02F 1/1335* (2006.01)
*G02F 1/1343* (2006.01)

(52) U.S. Cl.
CPC .. *G02F 1/133602* (2013.01); *G02F 1/134336* (2013.01)

(58) Field of Classification Search
CPC ............. G02F 1/133602; G02F 1/1323; G02F 1/133524; G02F 1/1334; G02F 1/134309; G02F 1/134336
See application file for complete search history.

(56) References Cited

U.S. PATENT DOCUMENTS

| 2005/0243265 A1 | 11/2005 | Winlow et al. |
| 2006/0061721 A1* | 3/2006 | Mimura ............ G02F 1/133606 349/139 |
| 2009/0109169 A1* | 4/2009 | Sumiyoshi ........ G02F 1/133504 345/102 |
| 2009/0237594 A1* | 9/2009 | Matsushima ........ G09G 3/3607 349/62 |
| 2016/0275875 A1* | 9/2016 | Wei ...................... G09G 3/3406 |
| 2017/0103715 A1* | 4/2017 | Oyama ................. G02F 1/1334 |

FOREIGN PATENT DOCUMENTS

| JP | 3922735 B2 | 3/2007 |
| JP | 4363225 B2 | 8/2009 |
| JP | 4766542 B2 | 6/2011 |

* cited by examiner

*Primary Examiner* — Liliana Cerullo
(74) *Attorney, Agent, or Firm* — Studebaker & Brackett PC

(57) ABSTRACT

A liquid crystal display device includes a liquid crystal panel including a plurality of pixels that are arranged in a matrix pattern, a backlight provided on a back surface side of the liquid crystal panel to emit light for illuminating the liquid crystal panel, and a viewing angle restriction film provided between the liquid crystal panel and the backlight to narrow light distribution of the light emitted from the backlight in one direction. Each pixel includes a plurality of sub-pixels that are arranged correspondingly to a plurality of display colors. An aperture in each sub-pixel is elongated in the one direction in a surface of the liquid crystal panel.

7 Claims, 9 Drawing Sheets

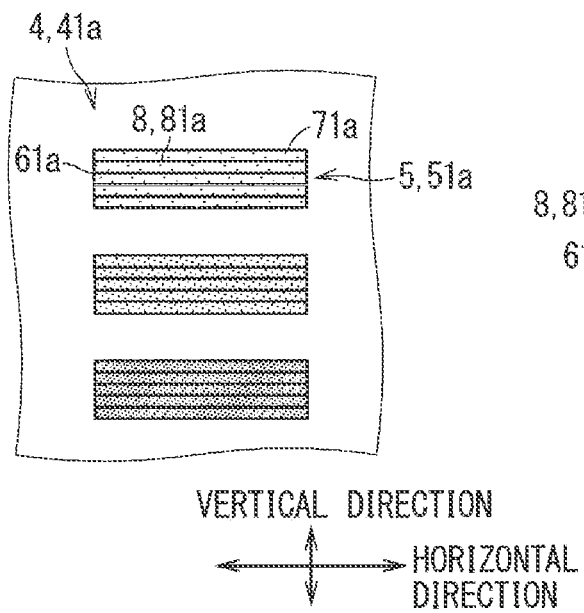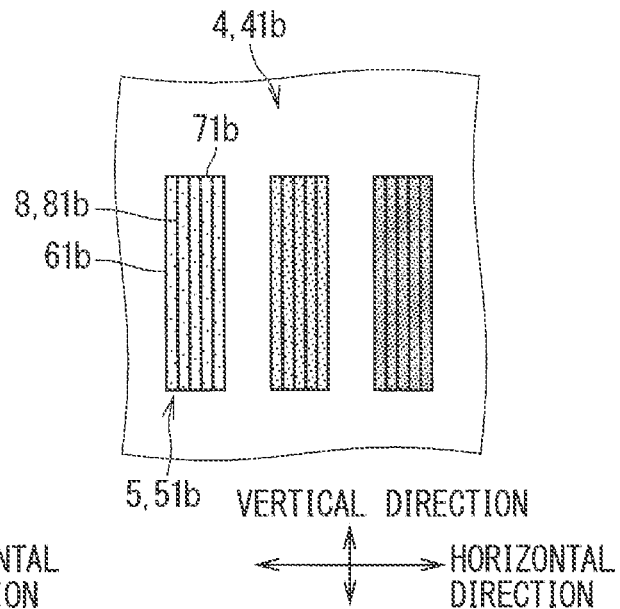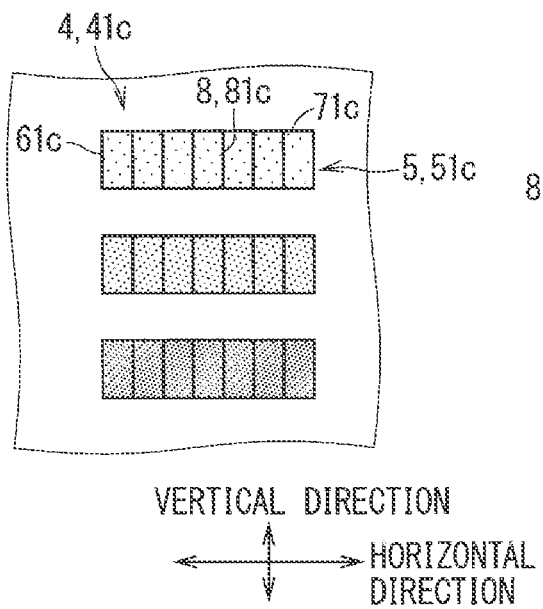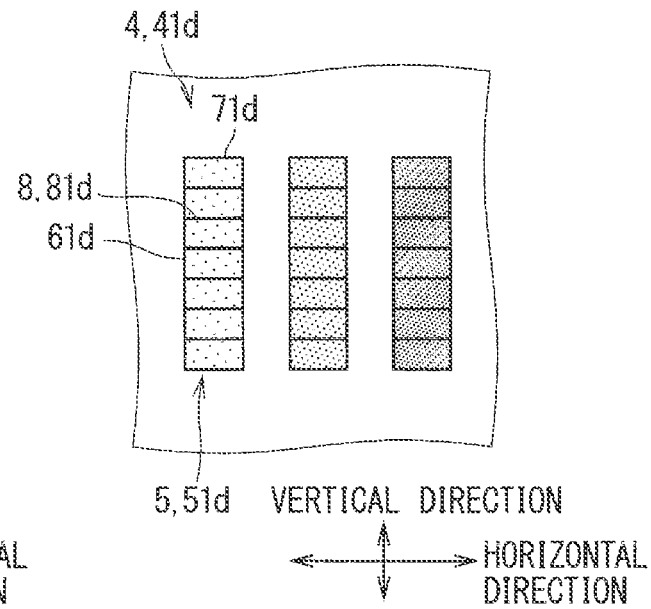

F I G. 1 1
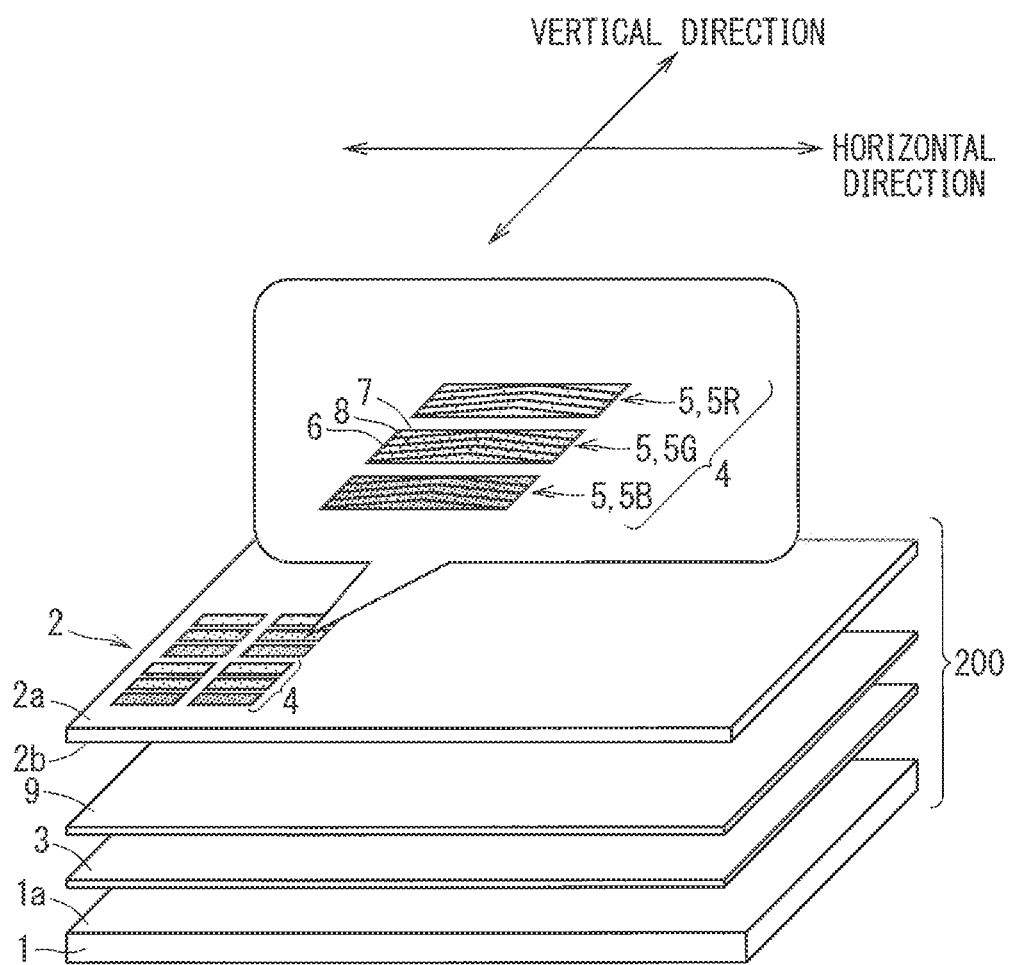

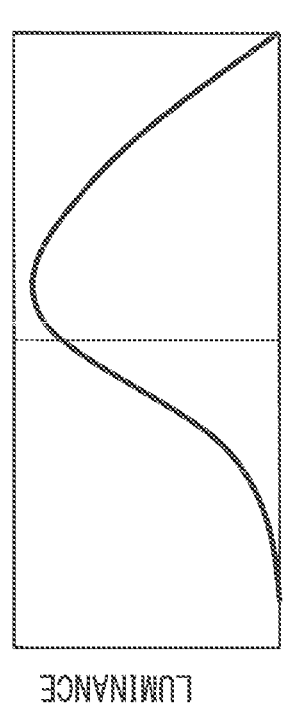
FIG. 16 TRANSMITTANCE DISTRIBUTION OF PANEL
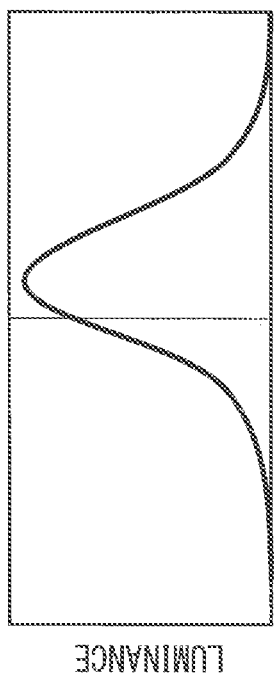
FIG. 17 LIGHT DISTRIBUTION OF LIQUID CRYSTAL DISPLAY DEVICE
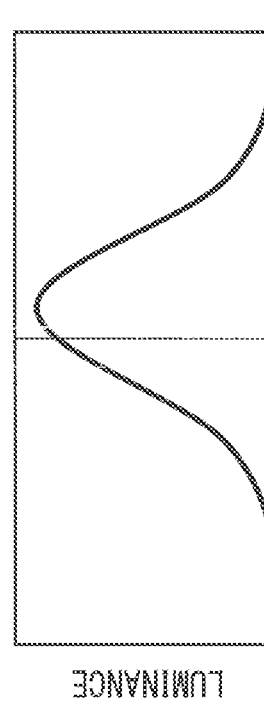
FIG. 15 LIGHT DISTRIBUTION OF BACKLIGHT

LIQUID CRYSTAL DISPLAY DEVICE AND ON-BOARD DISPLAY DEVICE

BACKGROUND OF THE INVENTION

Field of the Invention

The present invention relates to a liquid crystal display device and an on-board display device.

Description of the Background Art

An indoor display for a vehicle has been more and more installed. Even in a display for a passenger seat, realization of a large screen and high image quality has been promoted in order to watch a movie or the like. In this case, such a display device is required that normally has wide viewing angle characteristics and has a function of switching into light distribution characteristics narrow in a horizontal direction and not allowing an image to be seen from a driver's-seat direction as appropriate.

Japanese Patent No. 3922735 discloses a liquid crystal display device including a backlight unit and a transmission-type liquid crystal display panel that allows light from the backlight unit to be transmitted therethrough. The backlight unit has configuration capable of changing luminance. An optical element is arranged between the backlight unit and the liquid crystal display panel, and the liquid crystal display device has configuration in which the optical element is capable of changing scattering degree of light from the backlight unit toward the liquid crystal display panel. Further, the liquid crystal display device includes means for controlling two modes in which the luminance of the backlight and the light scattering degree of the optical element are associated. Of the two modes, one is a low power consumption mode in which the luminance of the backlight is reduced and the light scattering degree of the optical element is reduced, and the other is a wide viewing angle mode in which the luminance of the backlight is increased and the light scattering degree of the optical element is increased.

Japanese Patent No. 4766542 discloses a display including a display device and a liquid crystal device having a plurality of liquid crystal layers. Molecules of the liquid crystal layers are switchable between a first state and a second state. The first state is a state providing a first viewing angle range. The second state is a state providing a second viewing angle range which is within the first viewing angle range and is a viewing angle range narrower than the first viewing angle range. Further, the liquid crystal device has such a configuration as to at least partially block light propagating towards part of the first viewing angle range outside the second viewing angle range when the liquid crystal molecules are in the second state.

Japanese Patent No. 4363225 discloses a display device in which an optical device is arranged between a transmission-type display device and a surface light source. The surface light source is a light source of a side light type, and includes a transparent light guide plate having fine roughness in its surface. The surface light source gives directivity to its emitted light in a direction inclined by a predetermined angle from a direction perpendicular to a light emission surface of the surface light source. The optical device is capable of reversibly electrically switching a light beam scattering state and a light beam transmitting state. The display device brings the optical device into the light beam scattering state, thereby making a viewing angle of display larger than a viewing angle of display of the case where the optical device is in the light beam transmitting state.

In the related-art liquid crystal display device including such configurations as described above, transmitted light transmitted through the liquid crystal display panel is diffracted or scattered by a liquid crystal display panel thereof. Even when the liquid crystal display device is in a narrow viewing angle mode to display an image in a main display direction, the transmitted light is spread through diffraction or scattering. As a result, although the luminance is low, the image is visually recognized by an observer positioned in a direction other than the main display direction.

SUMMARY

The present invention has an object to provide a liquid crystal display device that restricts display of an image in a direction other than a main display direction.

A liquid crystal display device includes a liquid crystal panel including a plurality of pixels that are arranged in a matrix pattern, a backlight provided on a back surface side of the liquid crystal panel to emit light for illuminating the liquid crystal panel, and a viewing angle restriction film provided between the liquid crystal panel and the backlight to narrow light distribution of the light emitted from the backlight in one direction. Each of the plurality of pixels includes a plurality of sub-pixels arranged correspondingly to a plurality of display colors. Each of the plurality of sub-pixels is elongated in the one direction in a surface of the liquid crystal panel.

According to the present invention, it is possible to provide a liquid crystal display device that restricts display of an image in a direction other than the main display direction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 to FIG. 6 are plan views each illustrating a configuration of a pixel of the liquid crystal display device according to the first preferred embodiment.

FIG. 11 is a perspective view schematically illustrating a configuration of a liquid crystal display device according to a second preferred embodiment.

FIG. 15 is a chart showing light distribution characteristics of a backlight according to the third preferred embodiment.

FIG. 16 is a chart showing transmittance distribution of a liquid crystal panel according to the third preferred embodiment.

FIG. 17 is a chart showing light distribution characteristics of a liquid crystal display device according to the third preferred embodiment.

DESCRIPTION OF THE PREFERRED EMBODIMENTS

Description is given of preferred embodiments of a liquid crystal display device and an on-board display device according to this specification.

First Preferred Embodiment

Figure 1:
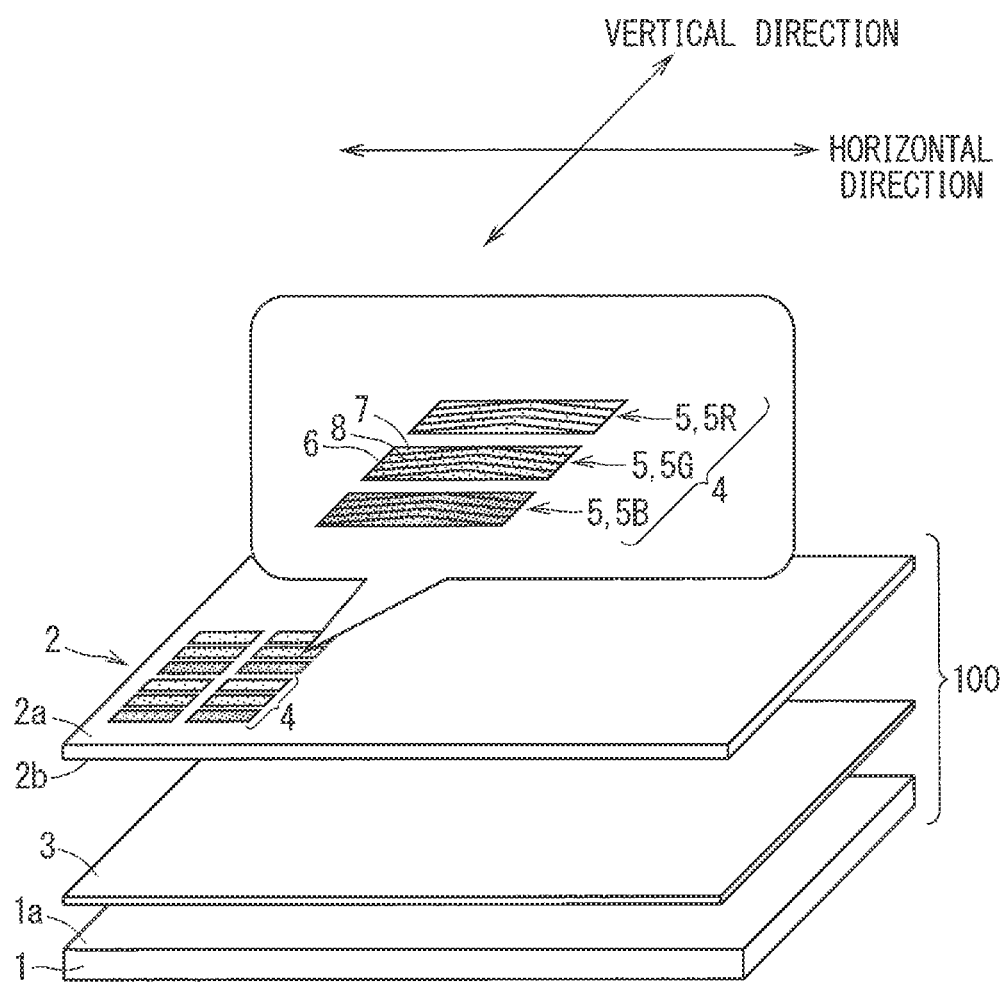
FIG. 1 is a perspective view schematically illustrating a configuration of a liquid crystal display device according to a first preferred embodiment.

FIG. 1 is a perspective view illustrating a configuration of a liquid crystal display device 100 according to a first preferred embodiment. The liquid crystal display device 100 includes a backlight 1, a liquid crystal panel 2, and a viewing angle restriction film 3.

The liquid crystal panel 2 is a transmission-type liquid crystal panel. To the first preferred embodiment, the liquid crystal panel 2 drives liquid crystals in a horizontal electric field mode. Specifically, the liquid crystal panel 2 drives liquid crystals in a fringe field switching (FFS) mode or in an in-plane switching (IPS) mode. Note that, IPS is a registered trademark of Japan Display Inc.

The liquid crystal panel 2 has a rectangular shape. In the first preferred embodiment, the liquid crystal display device 100 is installed so that a long-side direction of its rectangular shape is located in a crosswise direction and a short-side direction thereof is located in an up-and-down direction. The crosswise direction is hereinafter also referred to as a horizontal direction and the up-and-down direction as a vertical direction. The liquid crystal panel 2 has a back surface 2b on the backlight 1 side, and a display surface 2a on the opposite side to the back surface 2b.

The backlight 1 is provided on the back surface 2b side of the liquid crystal panel 2, and emits light for illuminating the liquid crystal panel 2 from an emission surface 1a. The emission surface 1a is opposed to the back surface 2b of the liquid crystal panel 2 with intermediation of the viewing angle restriction film 3 to be described later.

The viewing angle restriction film 3 is provided between the liquid crystal panel 2 and the backlight 1, that is, provided on the emission surface 1a side of the backlight 1. The viewing angle restriction film 3 narrows light distribution in one direction out of the light emitted from the backlight 1. In this first preferred embodiment, the one direction corresponds to the long-side direction of the rectangular shape of the liquid crystal panel 2, that is, the horizontal direction in FIG. 1. The viewing angle restriction film 3 is for example, an LCF film manufactured by 3M Company.

In the liquid crystal panel 2, a plurality of pixels 4 are arranged in a matrix pattern. The pixels 4 are arrayed in two directions of the long-side direction and the short-side direction of the rectangular shape of the liquid crystal panel 2. Each pixel 4 includes a plurality of sub-pixels 5 arranged correspondingly to a plurality of display colors displayed by the liquid crystal panel 2, that is, colors of a plurality of color filters of the liquid crystal panel 2. For example, the liquid crystal panel 2 illustrated in FIG. 1 is capable of displaying three colors of R, G, and B, and each pixel 4 includes three sub-pixels 5R, 5G, and 5B corresponding to those three colors.

Each sub-pixel 5 is elongated in the one direction in which the above-mentioned viewing angle restriction film 3 narrows light distribution in a surface of the liquid crystal panel 2. That is, an aperture of each sub-pixel 5 has such a substantially rectangular shape that a length of a first side 6 located in the vertical direction is shorter than a length of a second side 7 located in the horizontal direction.

Further, in the sub-pixel 5, an electrode 8 extending in the above-mentioned one direction is formed. The electrode 8 is a slit electrode in a case where the liquid crystal panel 2 drives liquid crystals in the FFS mode, and is a comb-shaped electrode in a case where the liquid crystal panel 2 drives liquid crystals in the IPS mode.

Figure 2:
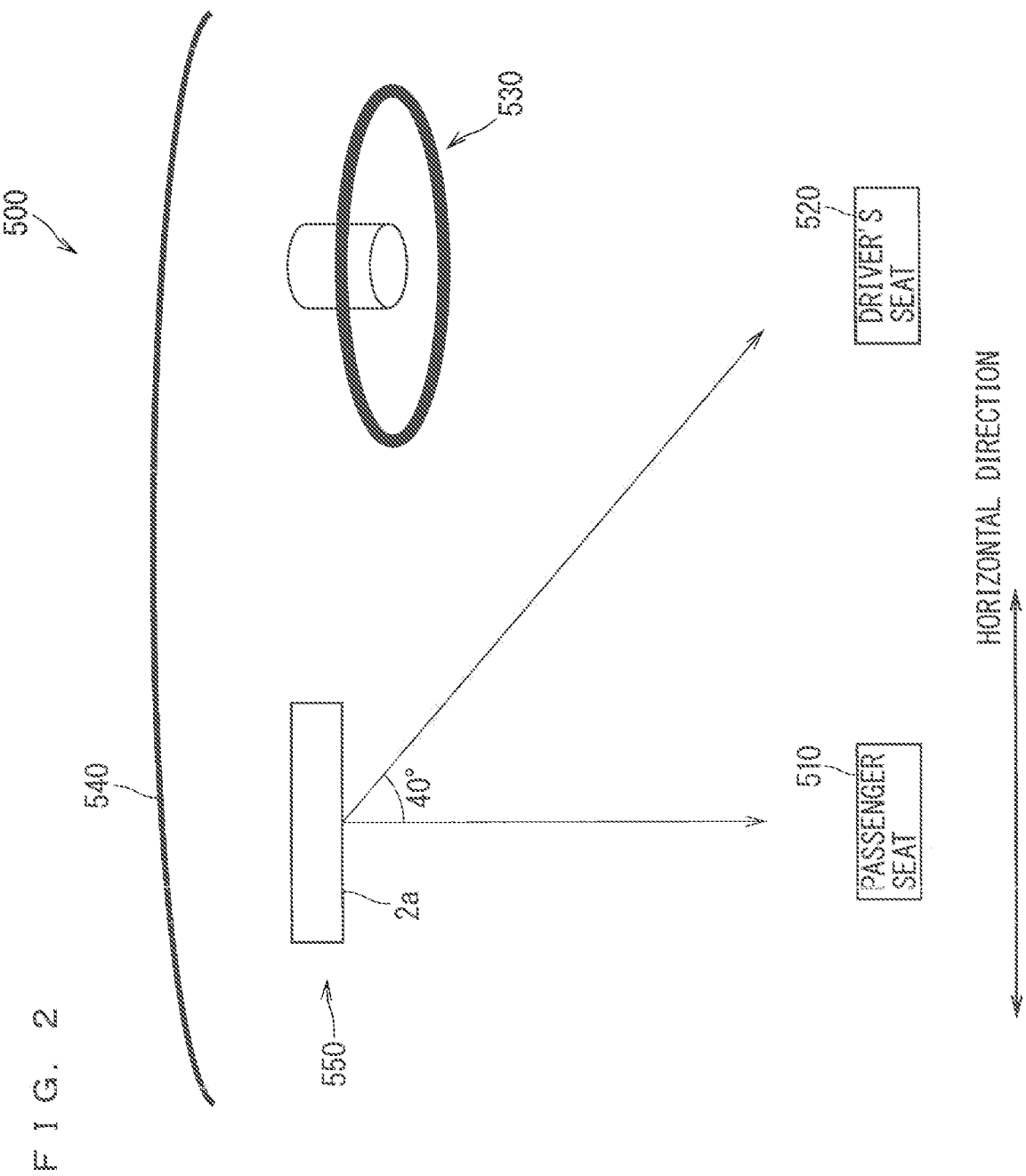
FIG. 2 is a schematic view illustrating arrangement of an on-board display device according to the first preferred embodiment.

FIG. 2 is a view illustrating arrangement of an on-board display device 550 in which the liquid crystal display device 100 is installed inside a vehicle 500, namely, a schematic view as viewed from an upper side of the vehicle 500.

The on-board display device 550 is arranged on a forward side of a passenger seat 510, that is, arranged substantially in front of the passenger seat 510. The display surface 2a of the liquid crystal panel 2 in the on-board display device 550 is opposed to the passenger seat 510. The on-board display device 550 is installed so that a long-side direction of its rectangular shape is located in the horizontal direction and a short-side direction thereof is located in the up-and-down direction. Note that, in FIG. 2, the up-and-down direction corresponds to a direction perpendicular to the drawing sheet. A drivers seat 520 is located next to the passenger seat 510 and is opposed to a steering wheel 530. The driver's seat 520 is located in a direction inclined by approximately 40° with respect to a straight line connecting the passenger seat 510 and a display surface of the on-board display device 550, that is, the display surface 2a of the liquid crystal panel 2. The above-mentioned one direction includes a direction connecting the passenger seat 510 and the driver's seat 520.

(Operation)

Now, description is given of operations of the liquid crystal display device 100 according to the first preferred embodiment. First, transmission of light emitted from the backlight 1 is described referring to FIG. 1. The light emitted from the emission surface 1a of the backlight 1 of the liquid crystal display device 100 enters the viewing angle restriction film 3. The viewing angle restriction film 3 narrows light distribution of the light in one direction. In FIG. 1, the one direction corresponds to the horizontal direction. The light emitted from the viewing angle restriction film 3 has light distribution characteristics narrow in the horizontal direction. For example, luminance of the light emitted from the viewing angle restriction film 3 in the direction inclined by 40° is reduced to be 1/10 of front luminance or less.

The light emitted from the viewing angle restriction film 3 is transmitted through the liquid crystal panel 2. Although the transmitted light is subjected to narrowing of its light distribution by the viewing angle restriction film 3 before entering the liquid crystal panel 2, the transmitted light propagating in the direction inclined by 40° may increase in some cases after being emitted from the liquid crystal panel 2. That is, the luminance in the direction inclined by 40° may increase to be ⅒ of the front luminance or more in some cases.

The above is caused under influence of diffraction or scattering due to the sub-pixels 5 of the liquid crystal panel 2. That is, when the light is transmitted through the aperture of each sub-pixel 5, diffraction or scattering in accordance with a shape of the aperture occurs, resulting in increasing transmitted light transmitted in the direction inclined by 40°.

As described above, in the liquid crystal display device 100 of the first preferred embodiment, the aperture of each sub-pixel 5 has such a substantially rectangular shape that is elongated in the horizontal direction. In the rectangular shape, the length of the first side 6 located in the vertical direction is shorter than the length of the second side 7 located in the horizontal direction. Diffraction in the horizontal direction is caused by the first side 6 located in the vertical direction orthogonal to the horizontal direction. The aperture of each sub-pixel 5 is elongated in the horizontal direction, thereby reducing the number of the first sides 6 in a surface of the liquid crystal panel 2. That is, the shape of the aperture of each sub-pixel 5 of the first preferred embodiment suppresses diffraction in the horizontal direction. As a result, in FIG. 2, the on-board display device 550 can suppress the increase of luminance in the direction inclined by 40 degrees, that is, in a driver's-seat direction, and prevents visual recognition of an image from the driver's-seat direction more securely than the related art. The liquid crystal display device 100 can restrict display of an image in a direction other than the direction from the on-board display device 550 to the passenger seat 510 being a main display direction.

Further, in the liquid crystal display device 100 of the first preferred embodiment, as described above, the electrode 8 formed in each sub-pixel 5 is formed in a direction to extend in the horizontal direction. In the liquid crystal panel 2 of the IPS mode or the FFS mode, transmittance distribution at the time of white display is formed in the aperture of the sub-pixel 5 along the electrode 8. Therefore, strong diffraction is caused in a direction orthogonal to the electrode 8. In the first preferred embodiment, the electrode 8 is provided to extend in the horizontal direction, and hence the liquid crystal display device 100 suppresses diffraction in the horizontal direction due to the electrode 8 and the transmittance distribution accompanying therewith. As a result, the liquid crystal display device 100 can suppress the increase of the luminance in the direction inclined by 40 degrees. Accordingly, visual recognition of an image of the on-board display device 550 from the driver's-seat direction is prevented more securely.

As described above, diffracted light generated at the time of transmittance through each sub-pixel 5 is radiated in a direction orthogonal to structures forming each sub-pixel 5. Therefore, in order to suppress diffracted light in the horizontal direction, it is desirable to reduce the number of structures extending in the vertical direction. FIG. 3 to FIG. 6 are plan views each schematically illustrating enlarged configuration of one pixel 4, in which four examples each having different shapes of the aperture of each sub-pixel 5 and directions of forming the electrode 8 are illustrated. Note that, the liquid crystal panel 2 including such a pixel 4 and an electrode 8 is a liquid crystal panel of the IPS mode or the FFS mode.

An aperture of each sub-pixel 51*a* in a pixel 41*a* illustrated in FIG. 3 has a rectangular shape elongated in the horizontal direction. That is, a length of a first side 61*a* located in the vertical direction is shorter than a length of a second side 71*a* located in the horizontal direction. Further, an electrode 81*a* extends in the horizontal direction. An aperture of each sub-pixel 51*b* in a pixel 41*b* illustrated in FIG. 4 has a rectangular shape elongated in the vertical direction. That is, the aperture of each sub-pixel 51*b* has such a rectangular shape that a length of a first side 61*b* located in the vertical direction is longer than a length of a second side 71*b* located in the horizontal direction. Further, an electrode 81*b* extends in the vertical direction. In an aperture of each sub-pixel 51*c* in a pixel 41*c* illustrated in FIG. 5, a length of a first side 61*c* located in the vertical direction is shorter than a length of a second side 71*c* located in the horizontal direction. An electrode 81*c* extends in the vertical direction. In an aperture of each sub-pixel 51*d* in a pixel 41*d* illustrated in FIG. 6, a length of a first side 61*d* located in the vertical direction is longer than a length of a second side 71*d* located in the horizontal direction. An electrode 81*d* extends in the horizontal direction.

Of FIG. 3 to FIG. 6, the pixel 41*a* illustrated in FIG. 3 has fewest structures extending in the vertical direction. On the other hand, the pixel 41*b* illustrated in FIG. 4 has most structures extending in the vertical direction, thus causing more diffraction in the horizontal direction.

Further, a shape of the aperture of each sub-pixel 5 capable of suppressing diffracted light or scattered light in the driver's-seat direction is not to be limited to the rectangular shape in which the length of the first side 61*a* in the vertical direction is shorter than the length of the second side 71*a* in the horizontal direction as illustrated in FIG. 3. FIG. 7 to FIG. 10 are plan views each schematically illustrating enlarged configuration of one pixel 4, in which modified examples of shapes of the aperture of each sub-pixel 5 are illustrated.

Figure 7:
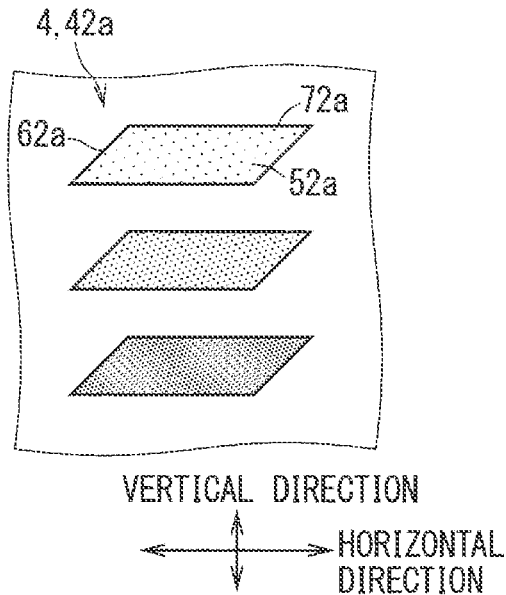
FIG. 7 to FIG. 10 are plan views each illustrating a configuration of a pixel of the liquid crystal display device according to the first preferred embodiment.

An aperture of each sub-pixel 52*a* in a pixel 42*a* illustrated in FIG. 7 is a parallelogram consisting of a first side 62*a* and a second side 72*a*. The second side 72*a* is located in the horizontal direction, and the first side 62*a* is located with clockwise inclination with respect to the vertical direction. Description is given of a case where the liquid crystal display device 100 including the liquid crystal panel 2 in which a plurality of the pixels 42*a* are arranged is installed inside the vehicle 500 as the on-board display device 550 as illustrated in FIG. 2. The driver's-seat direction is a direction having a polar angle of 40° and an azimuth angle of 0° with respect to the on-board display device 550. Diffracted light diffracted by each sub-pixel 52*a* spreads in an azimuthal direction orthogonal to the first side 62*a*. That is, the diffracted light spreads in a direction deviating from the driver's-seat direction.

Figure 8:
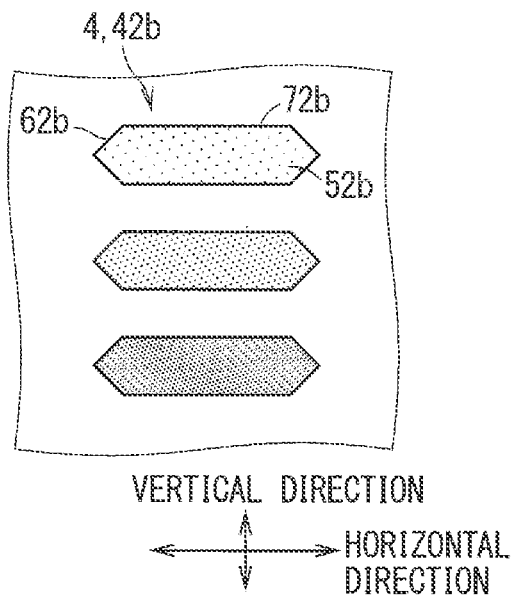

An aperture of each sub-pixel 52*b* in a pixel 42*b* illustrated in FIG. 8 has a first side 62*b* and a second side 72*b*. The second side 72*b* is located in the horizontal direction, and the first side 62*b* consists of two oblique lines inclined from the vertical direction. In a case where the driver's-seat direction is a direction having a polar angle of 40° and an azimuth angle of 0° with respect to the on-board display device 550, diffracted light diffracted by each sub-pixel 52*b* spreads in an azimuthal direction orthogonal to the two oblique lines inclined from the vertical direction. That is, diffracted light emitted from the on-board display device 550 illustrated in FIG. 2 spreads in a direction deviating from the driver's-seat direction.

Figure 9:
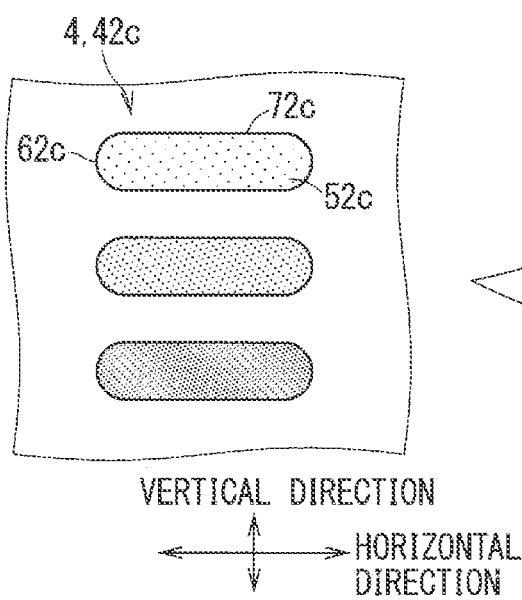

An aperture of each sub-pixel 52*c* in a pixel 42*c* illustrated in FIG. 9 consists of a first side 62*c* and a second side 72*c*. The second side 72*c* is located in the horizontal direction, and the first side 62*c* is formed of an arc. In a case where the driver's-seat direction is a direction having a polar angle of 40° and an azimuth angle of 0° with respect to the on-board display device 550, diffracted light diffracted by each sub-pixel 52c spreads in an azimuthal direction orthogonal to the arc. That is, the on-board display device 550 illustrated in FIG. 2 can reduce diffracted light to be diffracted in the driver's-seat direction.

Figure 10:
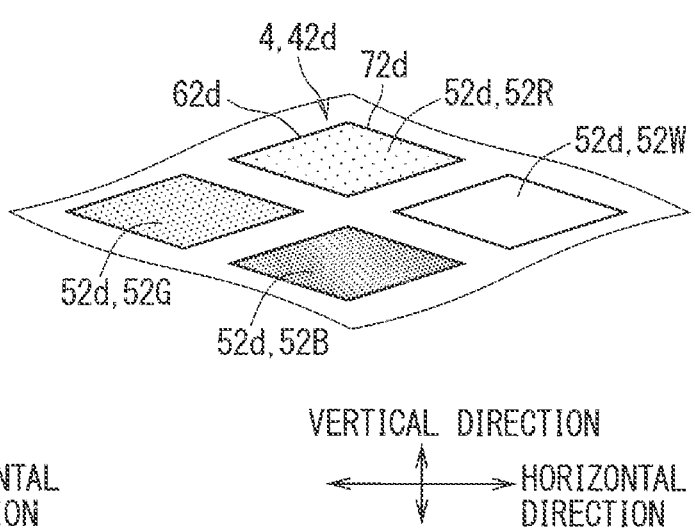

A pixel 42d illustrated in FIG. 10 is arrayed in two directions different from the long-side direction and the short-side direction of the rectangular shape of the liquid crystal panel 2. The pixel 42d includes, in addition to three sub-pixels 52R, 52G, and 52B corresponding to three colors of R, G, and B, a sub-pixel 52W for displaying white. An aperture of each sub-pixel 52d is a rhomboid elongated in the horizontal direction. The rhomboid consists of two oblique lines 62d and oblique lines 72d that are unparallel to any of the vertical direction and the horizontal direction. In a case where the driver's-seat direction is a direction having a polar angle of 40° and an azimuth angle of 0° with respect to the on-board display device 550, diffracted light diffracted by each sub-pixel 52d spreads in an azimuthal direction orthogonal to the two oblique lines 62d or oblique lines 72d. That is, diffracted light emitted from the on-board display device 550 illustrated in FIG. 2 spreads in a direction deviating from the driver's-seat direction.

As described above, a liquid crystal display device including the sub-pixels 5 having not only the shape of the aperture of each sub-pixel 51a in the pixel 41a illustrated in FIG. 3 but also the shapes of the apertures illustrated in FIG. 7 to FIG. 10 can suppress diffraction in the horizontal direction. Light diffracted due to the shapes of the apertures illustrated in FIG. 7 to FIG. 10 spreads in a direction deviating from the driver's-seat direction, and hence visual recognition of an image from the driver's-seat direction can be prevented more securely.

Those shapes of the apertures of the sub-pixels are effective not only for the transmission-type liquid crystal panel 2 of the IPS mode and the FFS mode, but similar effects are attained also for a transmission-type liquid crystal panel of a TN mode or an ECB mode. That is, those liquid crystal panels suppress diffraction in the horizontal direction, and prevent visual recognition of an image from the driver's-seat direction more securely.

To sum up the above, the liquid crystal display device 100 according to this first preferred embodiment includes the liquid crystal panel 2 including the plurality of pixels 4 that are arranged in a matrix pattern, the backlight 1 provided on the back surface 2b side of the liquid crystal panel 2 to emit light for illuminating the liquid crystal panel 2, and the viewing angle restriction film 3 provided between the liquid crystal panel 2 and the backlight 1 to narrow light distribution of the light emitted from the backlight 1 in one direction. Each pixel 4 includes the plurality of sub-pixels 5 arranged correspondingly to the plurality of display colors. The aperture in each sub-pixel 5 is elongated in one direction in a surface of the liquid crystal panel 2. In this first preferred embodiment, the above-mentioned one direction corresponds to the horizontal direction.

According to the configuration as described above, the liquid crystal display device 100 suppresses light diffracted by each sub-pixel 5 to spread in the one direction (horizontal direction). The liquid crystal display device 100 can maintain the light distribution characteristics narrow in the horizontal direction which are formed by the viewing angle restriction film 3 even after passing through the liquid crystal panel 2. The liquid crystal display device 100 restricts display in a direction other than its main display direction so as to prevent recognition of an image from a direction other than the main display direction.

Further, each sub-pixel 5 of the liquid crystal display device 100 extends in one direction, and further includes the electrode 8 for controlling drive of liquid crystals in the liquid crystal panel. According to such a configuration, the liquid crystal display device 100 suppresses light diffracted by the electrode 8 to spread in the one direction (horizontal direction). The liquid crystal display device 100 can maintain the light distribution characteristics narrow in the horizontal direction which are formed by the viewing angle restriction film 3 even after passing through the panel.

Further, in the onboard display device 550 according to this first preferred embodiment, the above-mentioned liquid crystal display device 100 is installed on the forward side of the passenger seat 510 of the vehicle 500. The display surface 2a located on the opposite side to the back surface 2b of the liquid crystal panel 2 is opposed to the passenger seat 510, and the one direction includes a direction from the passenger seat 510 to the driver's seat 520 that is located next to the passenger seat 510. According to such a configuration, the on-board display device 550 can restrict image display toward the driver's-seat direction while optimizing display characteristics of an image to be visually recognized from the passenger seat 510.

Second Preferred Embodiment

Description is given of a liquid crystal display device and the on-board display device according to a second preferred embodiment. FIG. 11 is a perspective view illustrating a configuration of a liquid crystal display device 200 according to the second preferred embodiment.

On the emission surface 1a side of the backlight 1, the viewing angle restriction film 3 (LCF film of 3M Company, for example) for narrowing light distribution in the horizontal direction is arranged. A scattering liquid-crystal sheet 9 capable of electrically changing scattering characteristics is further installed between the viewing angle restriction film 3 and the liquid crystal panel 2.

The scattering liquid-crystal sheet 9 capable of electrically changing scattering characteristics has, although illustration thereof is omitted, a stacking structure in which polymer dispersed liquid crystals (PDLCs) are sandwiched between two transparent plastic sheets that are arranged so as to be opposed to each other. In a surface of each of the two transparent plastic sheets, a transparent conductive film, that is, a transparent electrode, is formed, and the transparent conductive films are arranged facing inward so as to be opposed to each other. The scattering liquid-crystal sheet 9 is a light control film in which those two transparent plastic sheets and PDLCs are integrated through bonding. More specifically, the scattering liquid-crystal sheet 9 is, for example, an UMU film manufactured by NSG UMU Products Co., Ltd. (standard type/highly screening type). Note that, the UMU film is a registered trademark of Nippon Sheet Glass Company, Ltd.

Further, instead of the two transparent plastic sheets having transparent conductive films formed therein, two transparent substrates having transparent conductive films formed therein may be used. Those transparent substrates are, the example, a glass substrate, a translucent plastic substrate, or the like.

A liquid crystal mode of the liquid crystal panel 2 is the FPS mode or the IPS mode. The aperture of each sub-pixel 5 for the colors of R, G, and B in the liquid crystal panel 2 has, similarly to the first preferred embodiment, such a substantially rectangular shape that the length of the first side 6 located in the vertical direction is shorter than the length of the second side 7 located in the horizontal direction. Further, in the aperture of the sub-pixel 5, the electrode 8 is formed in a direction to extend in the horizontal direction. That is, configuration of the plurality of pixels 4 and the plurality of sub-pixels 5 in the liquid crystal panel 2 according to the second preferred embodiment is similar to that of the liquid crystal display device 100 illustrated in the first preferred embodiment.

(Operation)

Now, description is given of operations of the liquid crystal display device 200 and the on-board display device according to the second preferred embodiment. Description is herein given taking an example of a case where the liquid crystal display device 200 is installed in front of the passenger seat 510 inside the vehicle 500 illustrated in FIG. 2 to be used as the on-board display device 550. The passenger seat is located substantially in a front direction of the on-board display device 550, and the driver's seat is located in an inclined direction (approximately 40°) with respect to the horizontal direction.

Light emitted from the backlight 1 illustrated in FIG. 11 is converted into light in the one direction by the viewing angle restriction film 3, which herein is light having light distribution characteristics narrow in the horizontal direction. Light emitted from the viewing angle restriction film 3 passes through the scattering liquid-crystal sheet 9. The scattering liquid-crystal sheet 9 can electrically change its scattering characteristics between a transparent state and a scattering state.

Figure 12:
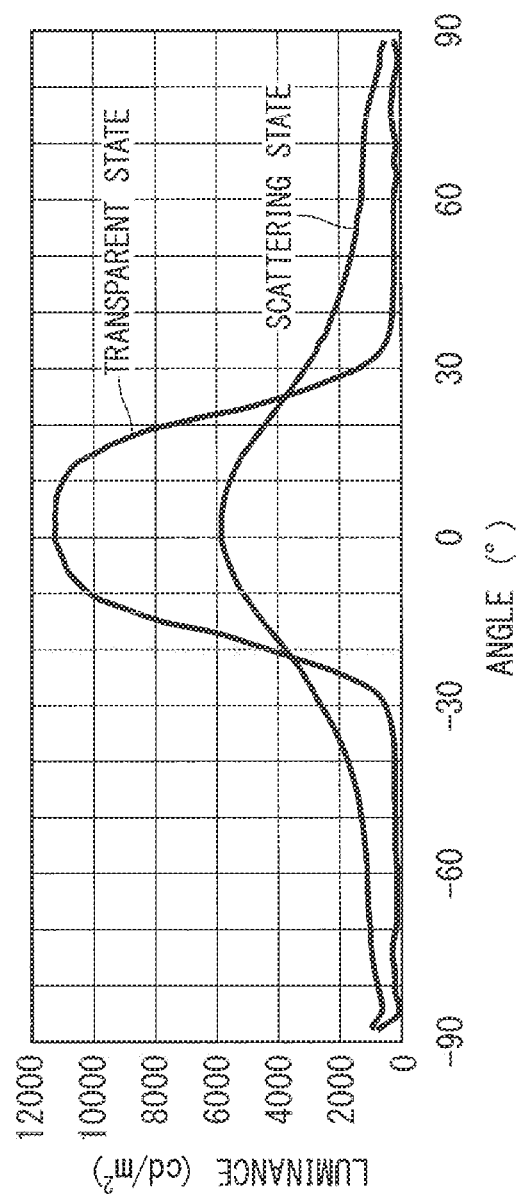
FIG. 12 is a graph showing light distribution characteristics of a scattering liquid-crystal sheet according to the second preferred embodiment.

FIG. 12 shows light distribution characteristics in the horizontal direction of the light passing through the scattering liquid-crystal sheet 9. In a case where the scattering liquid-crystal sheet 9 is in a transparent state, the passing light exhibits light distribution characteristics narrow in the horizontal direction. As in the light immediately after passing through the viewing angle restriction film 3, the light is mainly transmitted in the front direction (passenger-seat direction, angle of approximately 0° in FIG. 12), and the luminance in the direction inclined by 40 degrees (driver's-seat direction) is as low as 1/10 of the front luminance or less. That is, in a case where the scattering liquid-crystal sheet 9 is in a transparent state, a driver cannot visually recognize an image of the on-board display device 550, but a passenger in the passenger seat can visually recognize the image. This is referred to as a narrow viewing angle mode.

In contrast, in a case where the scattering liquid-crystal sheet 9 is in a scattering state, the luminance in the direction inclined by 40 degrees increases to be approximately 1/3 of the front luminance. This is referred to as a wide viewing angle mode.

As described above, the liquid crystal display device 200 according to the second preferred embodiment can switch the transparent state and the scattering state of the scattering liquid-crystal sheet 9. The on-board display device 550 enables, with its switching function, an image to be visually recognized from the driver's-seat direction as appropriate.

To sum up the above, the liquid crystal display device 200 according to this second preferred embodiment is provided between the viewing angle restriction film 3 and the liquid crystal panel 2, and further includes the scattering liquid-crystal sheet 9 capable of electrically changing scattering characteristics. The scattering liquid-crystal sheet 9 is a light control element in which polymer dispersed liquid crystals are arranged between two transparent substrates having transparent electrodes being formed therein. According to such a configuration, the liquid crystal display device 200 is capable of switching a state in which an image can be visually recognized from a direction other than the main display direction and a state in which the image cannot be visually recognized as appropriate. Further, at the time of the narrow viewing angle mode, the liquid crystal display device 200 restricts display in a direction other than its main display direction so as to prevent recognition of an image from a direction other than the main display direction.

Third Preferred Embodiment

Figure 14:
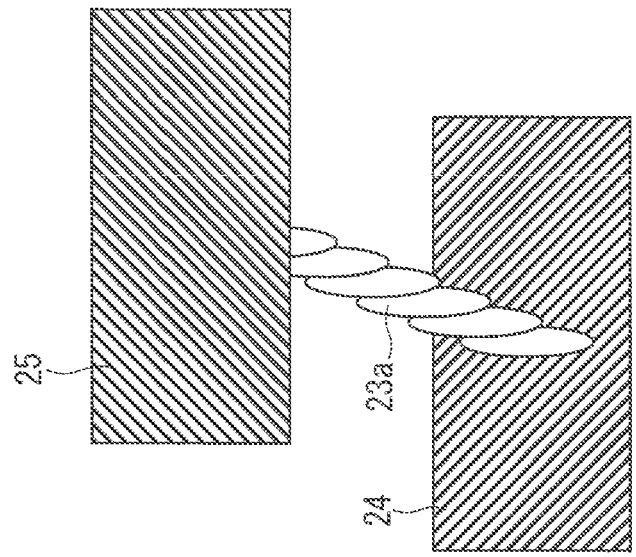
FIG. 14 is a view schematically illustrating orientation of liquid crystal molecules according to the third preferred embodiment.
Figure 13:
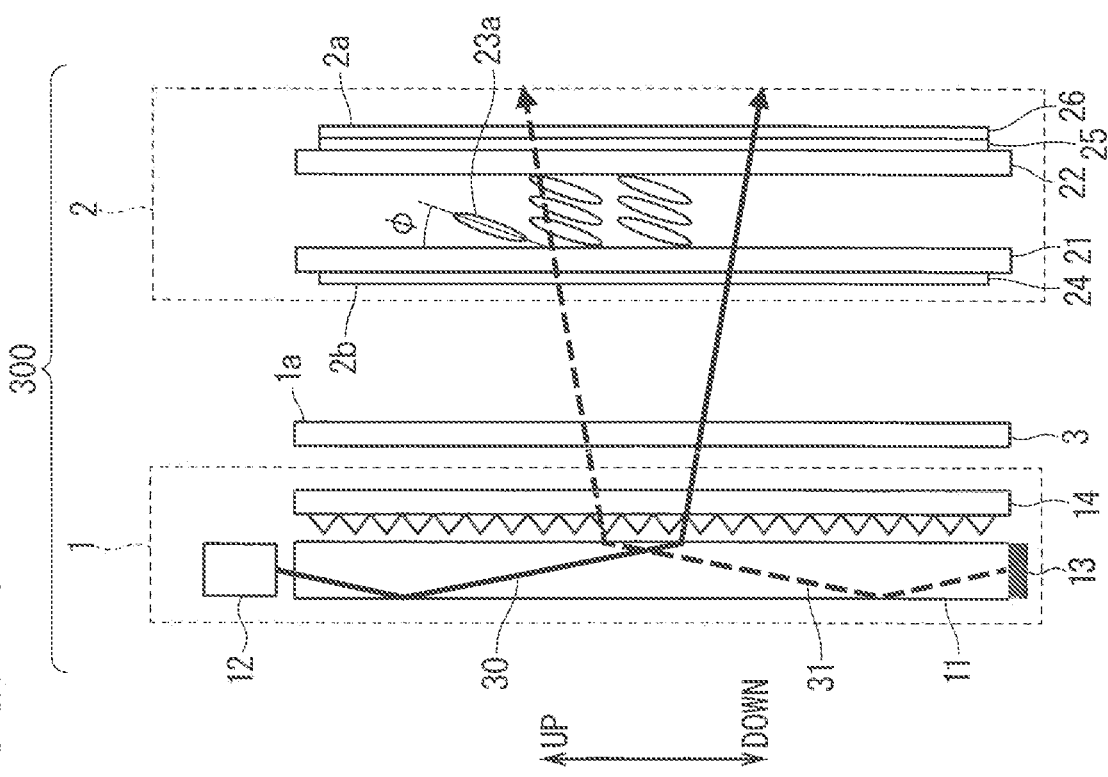
FIG. 13 is a cross-sectional view schematically illustrating a configuration of a liquid crystal display device according to a third preferred embodiment.

Description is given of a liquid crystal display device according to a third preferred embodiment. FIG. 13 is a cross-sectional view schematically illustrating a configuration of a liquid crystal display device 300 according to the third preferred embodiment. FIG. 14 is a view schematically illustrating orientation of liquid crystal molecules according to the third preferred embodiment.

As illustrated in FIG. 13, the liquid crystal display device 300 includes the backlight 1 and the transmission-type liquid crystal panel 2. The backlight 1 includes a light guide plate 11, a light source 12 installed so as to be opposed to an upper end surface of the light guide plate 11, a light absorbing member 13 provided on a side of a surface opposing to the upper end surface of the light guide plate 11, and an antiprism sheet 14 installed on a front side of the light guide plate 11.

On the emission surface 1*a* side of the backlight 1, the viewing angle restriction film 3 (LCF film of 3M Company, for example) for narrowing light distribution in the horizontal direction is arranged. Note that, in FIG. 13, the horizontal direction corresponds to a direction perpendicular to the drawing sheet.

Liquid crystal molecules 23*a* are sealed between a glass substrate 21 and a glass substrate 22 that form the liquid crystal panel 2. Polarizing plates 24 and 25 are attached to the glass substrates 21 and 22, respectively. A liquid crystal mode of the liquid crystal panel 2 is the ECB mode. FIG. 14 is a plan view schematically illustrating a relationship between orientation of the liquid crystal molecules 23*a* and an absorption axis of each of the polarizing plates. The liquid crystal molecules 23*a* are orientated at a pretilt angle φ (4° to 6°) in a 12 o'clock direction, and the polarizing plates 24 and 25 have absorption axes in 45° and −45" directions, respectively. Configuration of the plurality of pixels 4 and the plurality of sub-pixels 5 in the liquid crystal panel 2 is similar to that of the first preferred embodiment.

(Operation)

Now, description is given of operations of the liquid crystal display device 300 according to the third preferred embodiment. As illustrated in FIG. 13, light 30 entering the light guide plate 11 from the light source 12 travels toward a lower side while repeating total internal reflection on boundary surfaces of the light guide plate 11. The light 30 entering reflective dots (not shown) formed in the light guide plate 11 during traveling toward the lower side is emitted from the light guide plate 11 to enter the antiprism sheet 14. A triangular prism of the antiprism sheet 14 has an apex angle of from 60 degrees to 90 degrees, and deflects a traveling direction of the light 30 to a direction toward the liquid crystal panel 2.

The light absorbing member 13 is provided on a lower end surface of the light guide plate 11. Therefore, light propagating inside the light guide plate 11 and traveling to the lower end surface is not reflected but is absorbed. Thus, the light absorbing member 13 suppresses generation of light 31 propagating from a lower side to an upper side of the light guide plate 11 to be emitted from the emission surface 1a and the light 31 further transmitted through the liquid crystal panel 2 to travel toward an upper side from the display surface 2a. FIG. 15 is a chart showing light distribution characteristics of light emitted from the emission surface 1a of the backlight 1. Light emitted from the backlight 1 has peak luminance on a lower side with respect to the front direction. That is, the backlight 1 has light distribution characteristics in which luminance is lower on the upper side than on the lower side in the up-and-down direction crossing the above-mentioned one direction in the surface of the emission surface 1a.

The light 30 emitted from the backlight 1 is converted to have light distribution characteristics narrow in the horizontal direction by the viewing angle restriction film 3. On the other hand, light distribution in the up-and-down direction is not affected by the viewing angle restriction film 3. The light 30 after passing through the viewing angle restriction film 3 has peak luminance on the lower side with respect to the front direction, and enters the liquid crystal panel 2.

Further, the liquid crystal panel 2 having the liquid crystal molecules 23a and the polarizing plates 24 and 25 arranged therein and being controlled in the ECB mode as described above has transmittance distribution shown in FIG. 16 at the time of white display. The transmittance distribution exhibits transmittance low toward the upper direction. That is, the liquid crystal panel 2 has, in the surface of the display surface 2a, light distribution characteristics in which light transmittance is lower on the upper side than on the lower side in the up-and-down direction crossing the above-mentioned one direction at the time of white display.

The light 30 passing through the liquid crystal panel 2 has light distribution characteristics shown in FIG. 17 in which the light distribution characteristics of the backlight 1 shown in FIG. 15 and the transmittance characteristics of the liquid crystal panel 2 shown in FIG. 16 are incorporated. That is, the light 30 passing through the liquid crystal panel 2 has low luminance in the upper direction of the liquid crystal panel 2. For this reason, as illustrated in FIG. 2, in a case where the liquid crystal display device 300 is used as the on-board display device 550 to be installed in front of the passenger seat inside the vehicle, the on-board display device 550 does not hinder the field of view of the passenger.

Further, as illustrated in FIG. 13, the liquid crystal panel 2 in which a half-wavelength plate 26 is provided on a surface of the polarizing plate 25 at a predetermined angle rotates a polarization direction of the light 30 by a predetermined angle. As a result, a reflectance of the light 30 in a windshield 340 can be reduced. The on-board display device 550 can further suppress hindrance of the field of view of the passenger which is caused due to a reflection image in the windshield.

To sum up the above, the backlight 1 in the liquid crystal display device 300 according to this third preferred embodiment includes the emission surface 1a opposed to the back surface 2b of the liquid crystal panel 2 with intermediation of the viewing angle restriction film 3. The backlight 1 has light distribution characteristics in which luminance is lower on the upper side than on the lower side in the up-and-down direction crossing the one direction in the surface of the emission surface 1a. According to such a configuration, even in a case where a reflection surface such as the windshield 540 is located on the upper side of the liquid crystal display device 300, the reflection image in the reflection surface can be reduced.

Further, the liquid crystal panel 2 in the liquid crystal display device 300 has, in the surface of the display surface 2a located on the opposite side to the back surface 2b, light distribution characteristics in which light transmittance is lower on the upper side than on the lower side in the up-and-down direction crossing the one direction at the time of white display. According to such a configuration, even in a case where a reflection surface such as the windshield 540 is located on the upper side of the liquid crystal display device 300, the reflection image in the reflection surface can be reduced.

Fourth Preferred Embodiment

Figure 19:
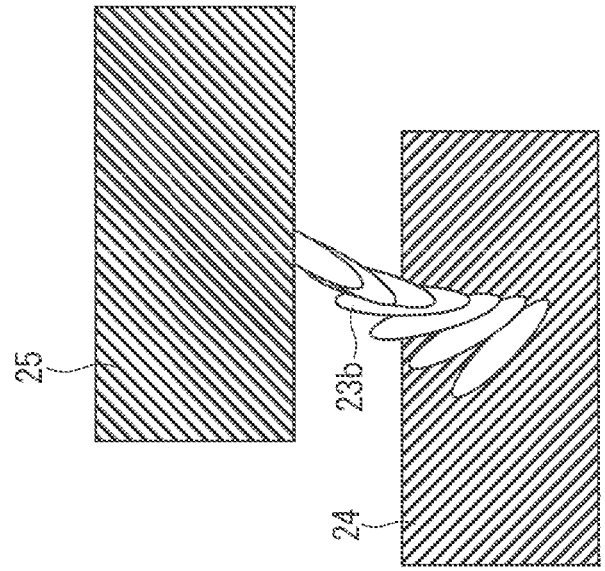
FIG. 19 is a view schematically illustrating orientation of liquid crystal molecules according to the fourth preferred embodiment.
Figure 18:
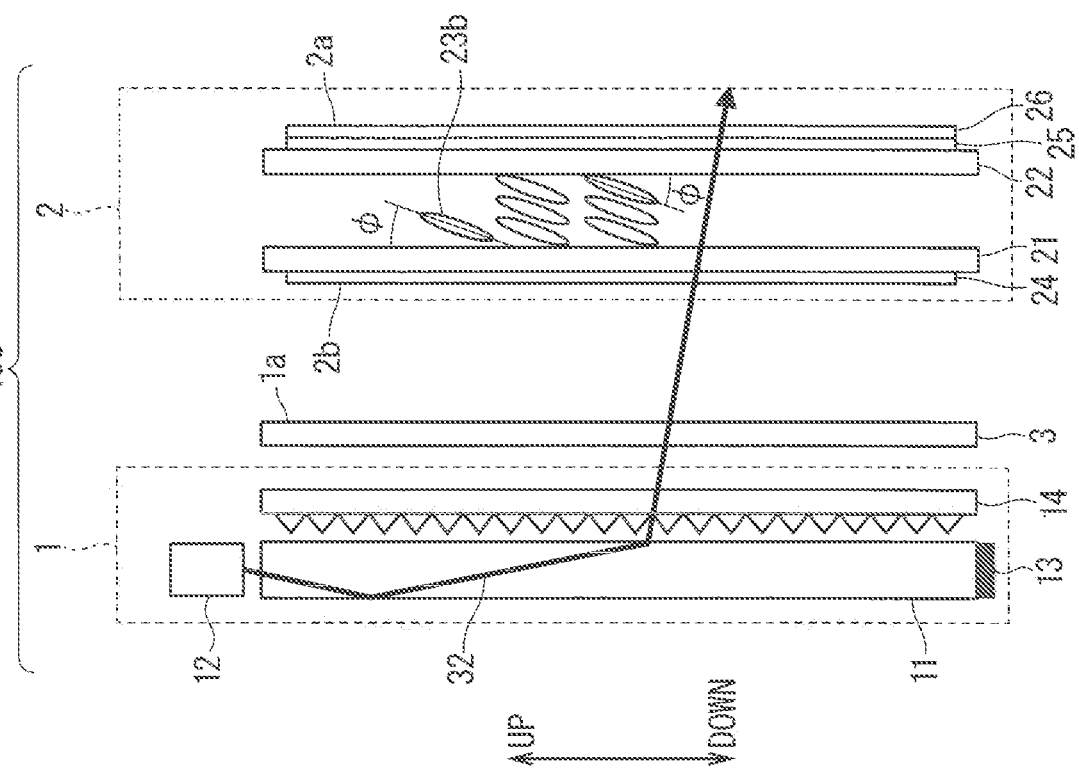
FIG. 18 is a cross-sectional view schematically illustrating a configuration of a liquid crystal display device according to a fourth preferred embodiment.

Description is given of a liquid crystal display device according to a fourth preferred embodiment. FIG. 18 is a cross-sectional view schematically illustrating a configuration of a liquid crystal display device 400 according to the fourth preferred embodiment. FIG. 19 is a view schematically illustrating orientation of liquid crystal molecules according to the fourth preferred embodiment. As illustrated in FIG. 18, the liquid crystal display device 400 is formed of the backlight 1 and the transmission-type liquid crystal panel 2. The backlight 1 has a configuration similar to that of the second preferred embodiment.

Liquid crystal molecules 23b are sealed between the glass substrate 21 and the glass substrate 22 that form the liquid crystal panel 2. The polarizing plates 24 and 25 are attached to the glass substrates 21 and 22, respectively. A liquid crystal mode of the liquid crystal panel 2 is the TN mode. The liquid crystal molecules 23b are orientated at 45° on the glass substrate 21 side and −45° on the glass substrate 22 side in the azimuthal direction and at a pretilt angle φ (4° to 6°). The polarizing plates 24 and 25 have absorption axes in 45° and −45° directions, respectively. Configuration of the plurality of pixels 4 and the plurality of sub-pixels 5 in the liquid crystal panel 2 is similar to that of the first preferred embodiment.

(Operation)

Now, description is given of operations of the liquid crystal display device 400 according to the fourth preferred embodiment. The operation of light 32 entering the light guide plate 11 from the light source 12 to enter the liquid crystal panel 2 is the same as that of the second preferred embodiment.

The liquid crystal panel 2 having the liquid crystal molecules 23b and the polarizing plates 24 and 25 arranged therein and being controlled in the TN mode as described above also has, similarly to the third preferred embodiment, transmittance distribution shown in FIG. 16. That is, the liquid crystal panel 2 of the fourth preferred embodiment also exhibits transmittance low toward the upper direction.

As a result, the light 32 passing through the liquid crystal panel 2 has, as shown in FIG. 17, low luminance in the upper direction of the liquid crystal panel 2. For this reason, as illustrated in FIG. 2, in a ease where the liquid crystal display device 400 is used as the on-board display device 550 to be installed in front of the passenger seat inside the vehicle, the liquid crystal display device 400 does not hinder the field of view of the passenger.

Further, as illustrated in FIG. 18, the liquid crystal panel 2 in which the half-wavelength plate 26 is provided on the surface of the polarizing plate 25 at a predetermined angle rotates a polarization direction of the light 32 by a predetermined angle. As a result, a reflectance of the light 32 in the windshield can be reduced. The on-board display device 550 can further suppress hindrance of the field of view of the passenger which is caused due to the reflection image in the windshield.

In each of the preferred embodiments described above, examples of the on-board display device 550 in which each liquid crystal display device is installed in the front direction of the passenger seat 510 are illustrated. The front direction herein is a direction corresponding to the forward side of the passenger seat 510, namely, basically a forward side of a vehicle or the like. The passenger seat 510 is located in the front direction with respect to the display surface of the on-board display device 550, that is, the display surface 2a of the liquid crystal panel 2. A range that falls within the front direction encompasses, for example, a range having approximately 10° on both sides with respect to the display surface of the on-board display device 550. That is, when the center of the passenger seat 510 is located within the range having approximately 10° on both sides, the passenger seat 510 may be regarded as being substantially in front, and effects equivalent to the effects described in each of the preferred embodiments can be obtained.

Note that, in the present invention, each of the preferred embodiments may be freely combined, and each of the preferred embodiments may be modified or omitted as appropriate within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
a liquid crystal panel including a plurality of pixels that are arranged in a matrix pattern;
a backlight provided on a back surface side of the liquid crystal panel to emit light for illuminating the liquid crystal panel; and
a viewing angle restriction film provided between the liquid crystal panel and the backlight to narrow light distribution of the light emitted from the backlight in one direction, wherein
each of the plurality of pixels includes a plurality of sub-pixels arranged correspondingly to a plurality of display colors;
a shape of an aperture of each of the plurality of sub-pixels is elongated in the one direction in a surface of the liquid crystal panel,
each of the plurality of sub-pixels includes a plurality of electrodes in the aperture for controlling drive of liquid crystals in the liquid crystal panel, and
the plurality of electrodes includes a repeating structure in which each electrode is repeatedly arranged in a short-side direction of the aperture.

2. The liquid crystal display device according to claim 1, further comprising a scattering liquid-crystal sheet provided between the viewing angle restriction film and the liquid crystal panel, the scattering liquid-crystal sheet being capable of electrically changing scattering characteristics.

3. The liquid crystal display device according to claim 2, wherein the scattering liquid-crystal sheet is a light control element in which polymer dispersed liquid crystals are arranged between two transparent substrates in which respective transparent electrodes are formed.

4. The liquid crystal display device according to claim 1, wherein the backlight has an emission surface opposed to the back surface of the liquid crystal panel with intermediation of the viewing angle restriction film, and has light distribution characteristics in which luminance is lower on an upper side than on a lower side in an up-and-down direction crossing the one direction in a surface of the emission surface.

5. The liquid crystal display device according to claim 1, wherein the liquid crystal panel has, in a surface of a display surface located on an opposite side to the back surface, transmittance characteristics in which light transmittance is lower on an upper side than on a lower side in an up-and-down direction crossing the one direction at time of white display.

6. The liquid crystal display device according to claim 1, wherein
each electrode is elongated in the one direction.

7. An on-board display device comprising the liquid crystal display device of claim 1 installed on a forward side of a passenger seat of a vehicle, wherein:
a display surface located on an opposite side to the back surface of the liquid crystal panel is opposed to the passenger seat; and
the one direction includes a direction from the passenger seat to a driver's seat that is located next to the passenger seat.

* * * * *